(12) United States Patent
Seno

(10) Patent No.: US 7,413,029 B2
(45) Date of Patent: Aug. 19, 2008

(54) SCREW FASTENING MACHINE

(76) Inventor: Tasuku Seno, Nitto Seiko Co., Ltd., 20 Umegahata, Inokura-cho, Ayabe, Kyoto, 623-0054 (JP)

( * ) Notice: Subject to any disclaimer, the term of this patent is extended or adjusted under 35 U.S.C. 154(b) by 0 days.

(21) Appl. No.: 11/824,332

(22) Filed: Jul. 2, 2007

(65) Prior Publication Data

US 2008/0000333 A1    Jan. 3, 2008

(30) Foreign Application Priority Data

Jun. 30, 2006  (JP)  ............................ P2006-182031

(51) Int. Cl.
*B25B 23/14* (2006.01)
(52) U.S. Cl. .................. 173/176; 173/11; 173/178; 173/216; 173/220; 81/57.44; 81/434
(58) Field of Classification Search ................ 173/220, 173/109, 93, 93.5, 178, 181, 159, 216, 11, 173/176; 81/57.44, 57.37, 434
See application file for complete search history.

(56) References Cited

U.S. PATENT DOCUMENTS

| | | | |
|---|---|---|---|
| 4,058,884 A | | 11/1977 | Lydon et al. |
| 5,170,852 A | | 12/1992 | Shikata et al. |
| 5,231,902 A | * | 8/1993 | Uno et al. ............... 81/57.44 |
| 5,289,886 A | | 3/1994 | Shikata et al. |
| 5,544,534 A | | 8/1996 | Fujitaka |
| 5,595,251 A | | 1/1997 | Cook, Jr. |
| 5,730,035 A | * | 3/1998 | Ohmori et al. ........... 81/57.44 |
| 5,947,210 A | * | 9/1999 | Sasaki et al. ............. 173/178 |
| 6,247,387 B1 | * | 6/2001 | Ketteringham ............. 81/467 |
| 6,782,957 B2 | | 8/2004 | Fujiyama |
| 6,942,042 B2 | * | 9/2005 | Lee ............................ 173/11 |
| 7,013,985 B2 | * | 3/2006 | Sasaki et al. ................ 173/11 |
| 7,104,433 B2 | * | 9/2006 | Fujiyama ..................... 228/8 |

FOREIGN PATENT DOCUMENTS

| | | |
|---|---|---|
| JP | 1981-3186 A | 1/1981 |
| JP | 1981-157965 A | 12/1981 |
| JP | 1984-69273 A | 4/1984 |
| JP | 1985-52268 A | 3/1985 |
| JP | 1995-24746 A | 1/1995 |
| JP | 1996-66874 A | 3/1996 |
| JP | 2004-283948 A | 10/2004 |

* cited by examiner

*Primary Examiner*—Scott A. Smith

(57) ABSTRACT

The present invention aims to provide a screw fastening machine for reliably switching and changing a driving force transmitting path with the seating on a work as a reference.

According to the screw fastening machine in which a first pulley is connected to a first driving mechanism for applying high speed low torque drive to a drive shaft, a second pulley is fixed in an integrally rotatable manner to a transmission shaft for connecting the drive shaft, and an endless belt is interposed between the pulleys to obtain a configuration for high speed low torque drive, a second driving mechanism for low speed high torque drive is arranged on an extension of the transmission shaft, and the second driving mechanism performs the drive until a final fastening torque is reached when a screw component is seated on the work and the stall state is achieved, the final fastening torque is always reliably obtained and the work time is reduced without waste. Since the second driving mechanism for low speed high torque is not rotatably driven while the first driving mechanism for high speed low torque is being driven, the power is not wasted and energy-saving effect that fits with the times is obtained.

5 Claims, 4 Drawing Sheets

SCREW FASTENING MACHINE

BACKGROUND OF THE INVENTION

1. Field of the Invention

The present invention relates to a screw fastening machine of first screwing in screw components such as bolt and nut at high speed rotation, and then fastening the screw components to a work at a final fastening torque set in advance.

2. Description of the Related Art

A machine that automatically supplies a component at every work cycle, and fastens the component to a work is well known as an automatic screw fastening machine of bolt, nut, screw and the like that is generally well known in the conventional art. One example of such screw fastening machine has a configuration that uses a bit engageable to a drive hole having a rectangular shape such as cross-shape or hexagon socket formed at a head of the screw and connects the bit to an electrically operated driver by way of a bit drive shaft. When fastening the screw to the work with such screw fastening machine, a electrically operated driver is driven with the bit engaged to the drive hole of the screw. A rotation force is then transmitted from the bit to the screw, and the screw is fastened to the work.

Such screw fastening machine is not suited for screw fastening work in areas where high screw fastening precision (fastening torque with small variance) is demanded, and is not frequently adopted when the fastening torque must comply with the rule. The fastening machine shown in FIG. 4 is thus proposed as one example of the screw fastening machine that have been recently used as the screw fastening machine of stable fastening torque. This is the screw fastening machine disclosed in Japanese Laid-Open Patent Publication No. 60-052268, where a low speed high torque driver 130 and a high speed low torque driver 110 are simultaneously driven after the screw is held at a chuck unit (not shown). In this case, an outer ring 141 slips with respect to an inner ring 144 by a one-way clutch 140, and a driver bit (not shown) rotates in response to the rotation of only the high speed low torque driver 110 via a driver shaft 105 to fasten the screw at high speed. In this operation, the number of rotations of the high speed low torque driver 110 lowers as the screw gets fastened and when becoming lower than the number of rotations of the low speed high torque driver 130, the rotation of the low speed high torque driver 130 is transmitted to a gear coupled driver shaft 105 by the operation of the one-way clutch 140, thereby screw fastening to a final fastening torque at low speed.

SUMMARY OF THE INVENTION

However, in such screw fastening machine, when start signal is input, current flows to both a high speed low torque driver and a low speed high torque driver thereby rotating the drivers, which goes against the times in the environment where energy saving is demanded as in today and thus is not accepted in a market. Furthermore, since both torque drivers rotate, an impact torque in time of seating becomes high, and an accurate final fastening torque cannot be obtained. Furthermore, due to the configuration where rotation of the low speed high torque driver is coupled and driven by the gear, the noise in time of screw fastening work becomes relatively high and the impact at completion of screw fastening also becomes high. In addition, due to the configuration where switch to low speed rotation occurs in the middle of high speed rotation, if such switching occurs at a position before the screw is seated, the screw fastening time with the low speed high torque driver becomes long, the work time of the entire screw fastening work becomes long, and the work cost increases. Furthermore, when a rotation power transmitting path changes due to a seating of the screw, a seating torque changes by a shape of the lower hole of the work or the shape of the screw thread, and thus the one-way clutch must be changed according to such shape and must be replaced from time to time, which in reality, cannot be responded.

It is an object of the present invention to overcome the above problems and to provide a screw fastening machine that reliably switches and changes a transmitting path of the driving force with the seating of the screw component on the work as the reference.

The object of the present invention is realized by a screw fastening machine including a drive shaft 5 for engaging a screw component and screwing in the screw component to a work, a first driving means for applying driving force of high speed low torque to the drive shaft 5, and a second driving means for applying driving force of low speed high torque when the high speed low torque drive is finished; wherein a first pulley 20 is fixed to a first output shaft 11 of the first driving means, a second pulley 21 is fixed in an integrally rotatable manner to a transmission shaft 4 for connecting the drive shaft 4, and an endless belt 23 is interposed between the pulleys to obtain a configuration for high speed low torque drive; the second driving means for performing low speed high torque drive is arranged on a back side on an extension of the transmission shaft 4 until a final fastening torque is reached, a clutch member 40 is interposed between a second output shaft 32 of the second driving means and the transmission shaft 4, and the first and second driving means are electrically connected to a control unit 6 having a configuration of performing a control such that the rotation drive changes from by the first driving means to by the second driving means so that the second driving means rotatably drives the transmission shaft 4 until the final fastening torque is reached when the screw component is seated on the work by the high speed low torque screwing work by the first driving means and a stall state is achieved.

Furthermore, in the configuration of the screw fastening machine for achieving the object, gearing of the clutch member is normally released, but gearing occurs when a rotation switching signal from the first driving means to the second driving means is input so that a rotation driving force from the second driving means is transmitted to the drive shaft 5 via the transmission shaft 4, whereby the switching and changing of the rotation power transmitting path becomes smooth. Furthermore, in such configuration, one of the clutch member 40 is a fixed clutch strip 41 fixed to the second output shaft 32 of the second driving means and the other is a movable clutch strip 44 rotatable with respect to the second output shaft 32, the movable clutch strip 44 being rotatable with the transmission shaft 4, the movable clutch strip 44 being electromagnetically absorbed to the fixed clutch strip 41 when a stop signal of the first driving means is input so that the driving force from the second driving means is transmitted to the transmission shaft 4, whereby switching and changing of the rotation power transmitting path is reliably performed.

In addition to such configuration, the second driving means is adapted to transmit the rotation driving force to the second output shaft via a harmonic drive (registered trademark) reducer 31 for converting the driving force from the second motor 30 to the driving force of low speed high torque, and thus a large reduction ratio is obtained and the final fastening torque sufficient to fasten the screw component is also reliably obtained.

Moreover, in such configuration, the control unit is configured to determine the maximum number of rotations of the first driving means so that an impact torque, which is generated when the screw component is screwed in at high speed rotation by the first driving means with respect to the final fastening torque set according to the type of the screw component and the screw component is seated on the work thereby entering the stall state, does not exceed the final fastening torque, and thus the fastening time from the start of the screwing work until the final fastening torque is obtained is reduced without waste.

According to the present invention, when the screw component is reliably seated on the work and the first driving means for high speed low torque reliably enters the stall state, the torque of the first driving means becomes zero-state, and simultaneously, the second driving means for low speed high torque rotatably drives instead, whereby the final fastening torque is always reliably obtained and the fastening work time for fastening the screw component to the work is reduced without waste. The screw fastening machine is not configured such that both driving means are always rotatably driven, and the second driving means for the low speed high torque is not rotatably driven while the first driving means for high speed low torque is being rotatably driven, whereby the power is consumed without waste and energy-saving effect that fits with the times is achieved. Furthermore, although the low speed high torque driver transmits power by gear in the machine of the conventional art, in the present invention, the first driving means for high speed low torque belt drives the transmission shaft, and thus the noise in time of high speed rotation drive is reduced and an impact force is slightly alleviated, whereby a relatively low impact torque can be easily obtained. Moreover, high speed rotation is performed from an initial stage of screwing until the screw component is seated, and after seating, the low speed high torque rotation is reliably transmitted to the transmission shaft, whereby inherent effects are obtained such as the fastening cost of the screw component is reduced, electrical process merely needs to be performed even if the seating torque is changed by the shape of the lower hole of the work and the shape of the screw thread since a mechanical one-way clutch is not used as in the conventional art, and adjustment of switching and changing of the driving means by seating is facilitated.

DETAILED DESCRIPTION OF THE PREFERRED EMBODIMENTS

Figure 1:
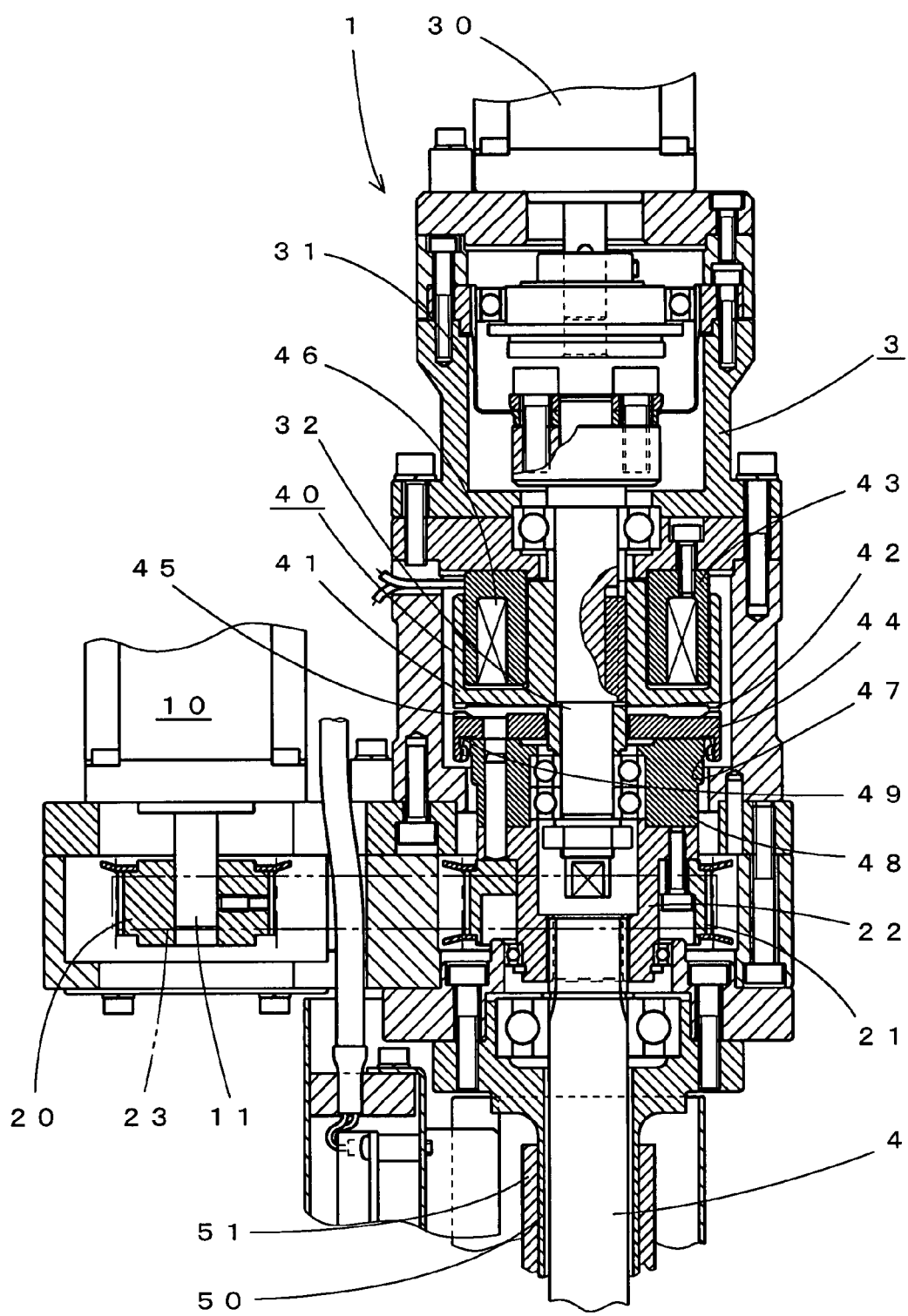
FIG. 1 is an enlarged cross sectional view of the main parts of the present invention.
Figure 2:
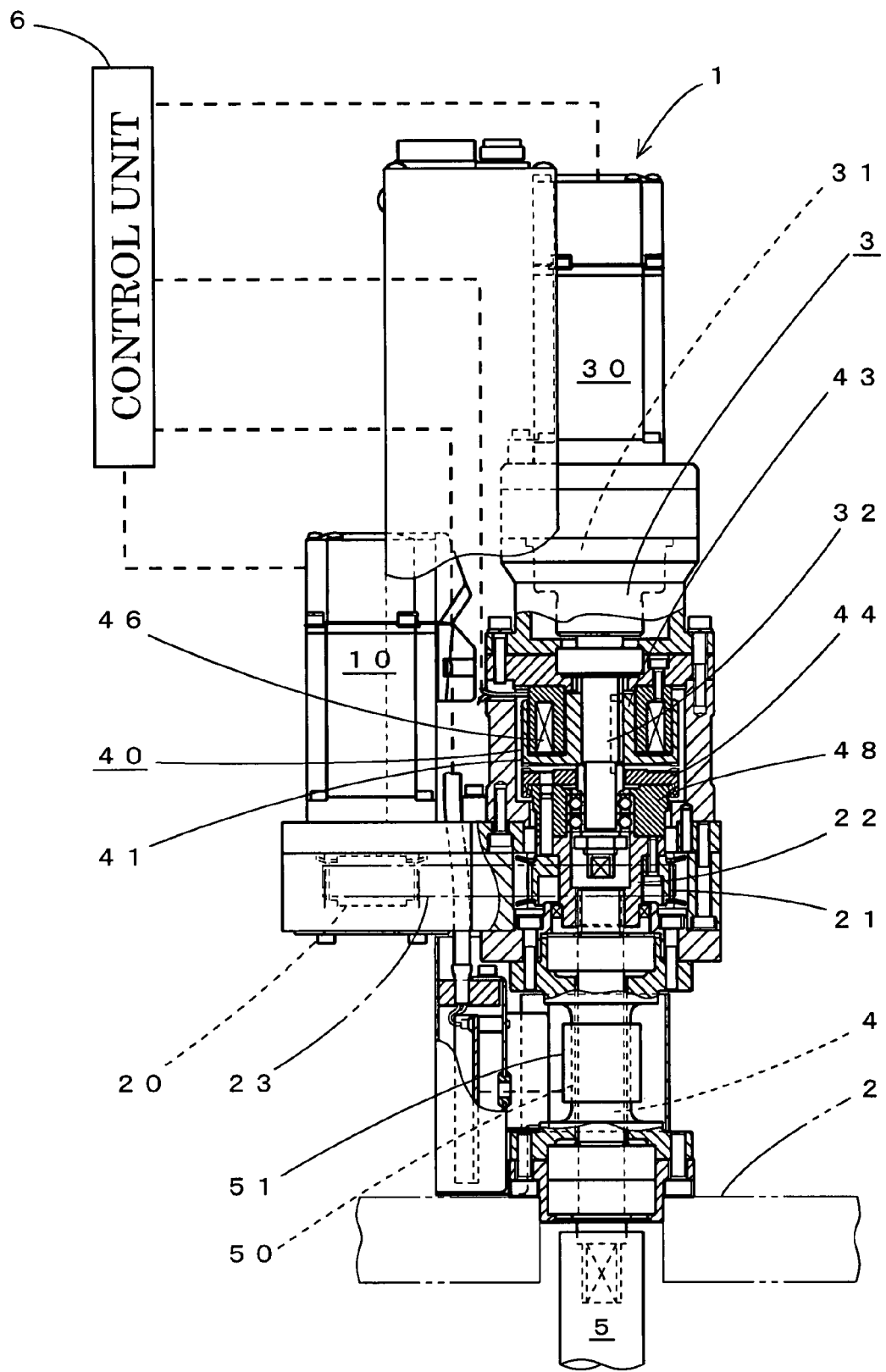
FIG. 2 is a partial cross sectional view showing a schematic configuration of the present invention.
Figure 3:
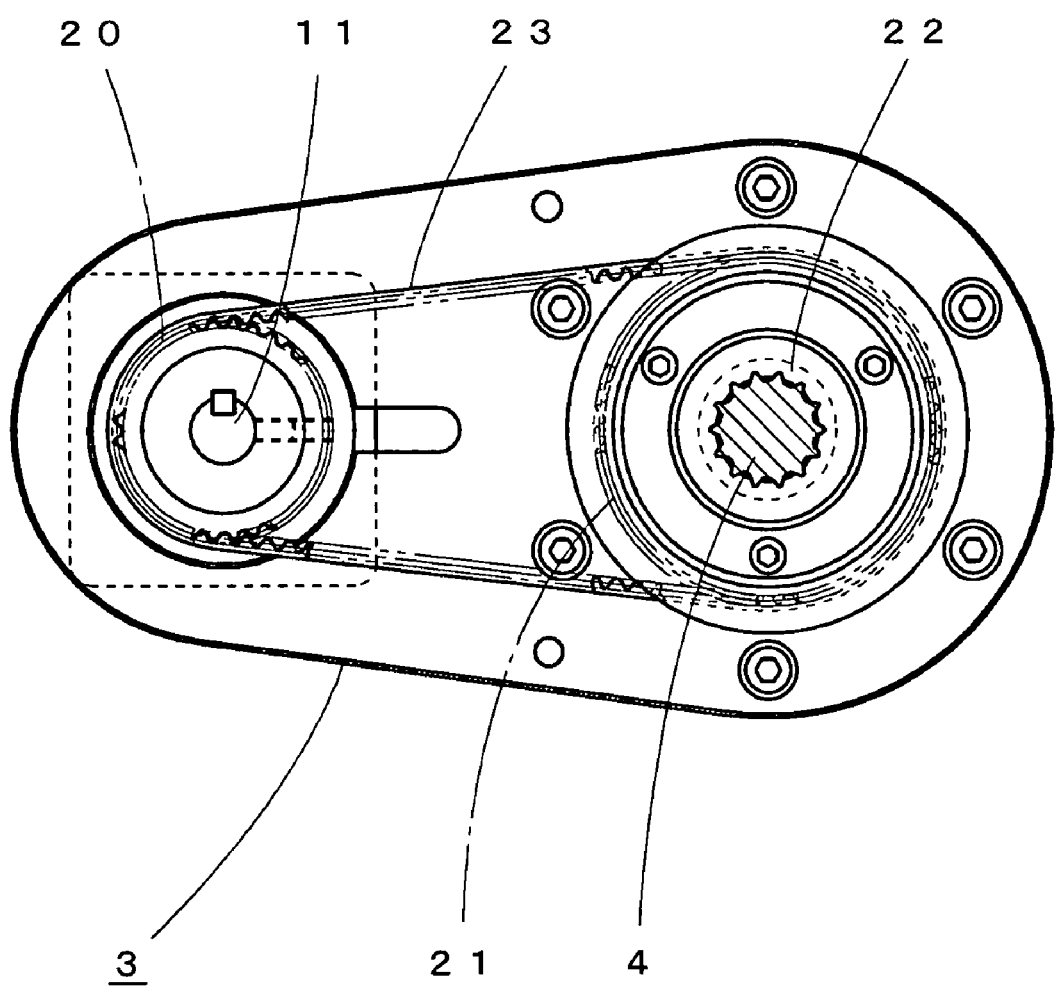
FIG. 3 is a bottom view excluding a housing on the lower side showing an endless belt conveying path.
Figure 4:
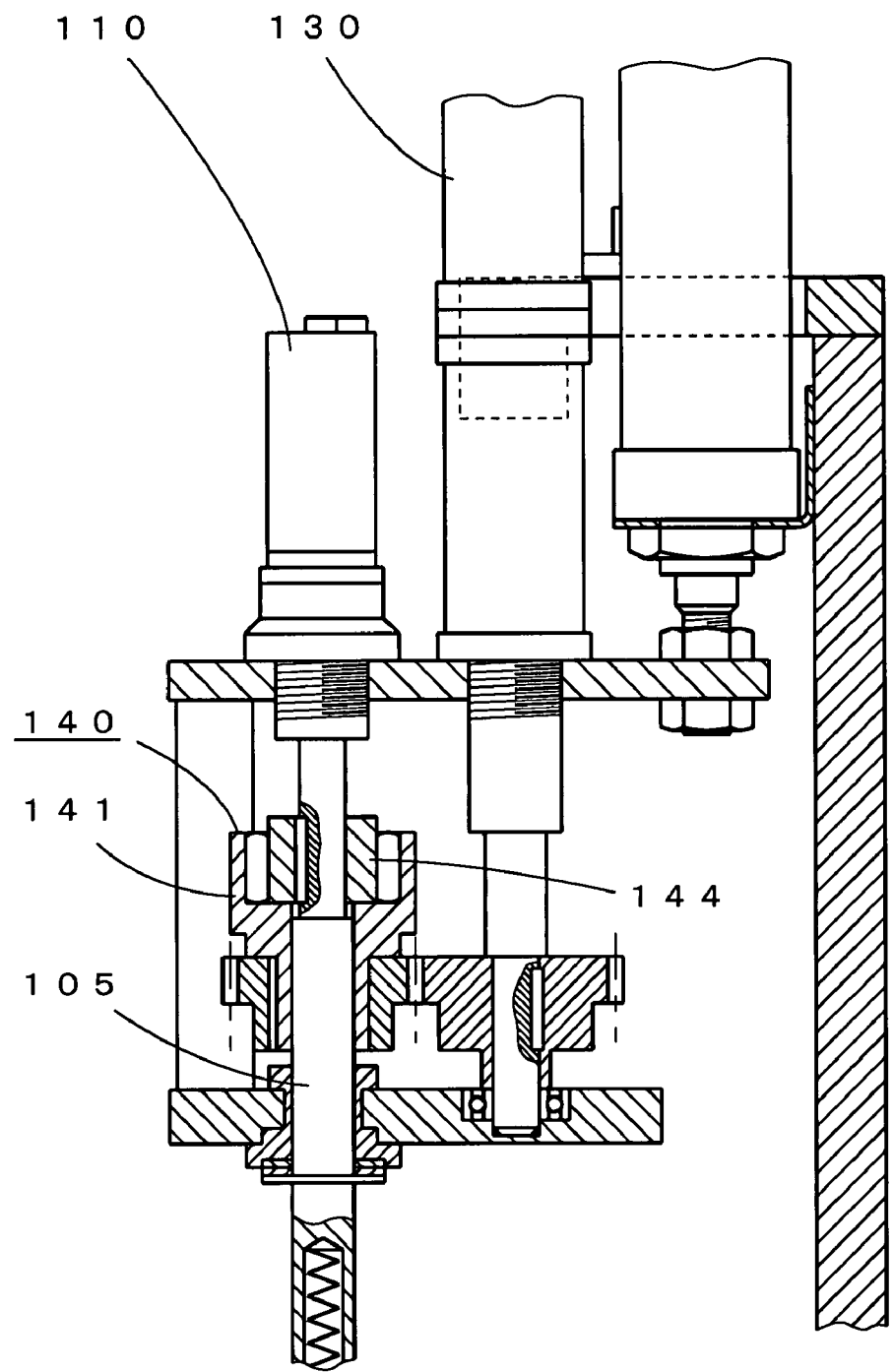
FIG. 4 is a cross sectional view of the main parts showing a conventional art example of the present invention.

The embodiments of the present invention will now be described based on FIGS. 1 to 3. In FIG. 2, reference numeral 1 indicates a screw fastening machine supported by a raising/lowering stage 2 serving as a raising/lowering means, and the screw fastening machine 1 is covered by a housing 3. A first motor 10 serving as a first driving means that rotatably drives at high speed low torque is fixed to the housing 3, and a first pulley 20 is fixed to a first output shaft 11 of the first motor 10, as shown in FIG. 1. A second motor 30 serving as a second driving means parallel to the first driving means is arranged on another central line at a position parallel to a central line of the first output shaft 11. The second motor 30 is also fixed to the housing 3, and a reducer 31 for converting a rotation of the second motor 30 to low speed high torque is connected to the second motor 30. The reducer 31 has a configuration referred to as harmonic drive (registered trademark), which converts a rotation input from the second motor 30 to the rotation of low speed high torque and outputs the rotation. Such configuration is disclosed in Japanese Laid-Open Patent Publication No. 58-196349, Japanese Laid-Open Patent Publication No. 59-113342, and the like, which are already known before the filing of the present invention and thus the description thereof will not be given herein.

The second motor 30 and the reducer 31 of harmonic drive mechanism configure a second driving means that rotatably drives at low speed high torque until a final fastening torque is reached, where a fixed clutch strip 41 configuring a clutch member 40 is fixed to a second output shaft 32 of the second driving means so as to integrally rotate with the second output shaft 32. A holding block 43 incorporating a cylindrical electromagnet 46 is fixed to the housing 3 in the fixed clutch strip 41, and the fixed clutch strip 41 is rotatable with respect to the holding block 43. A clutch tooth 42 is formed near an outer periphery of a lower end of the fixed clutch strip 41, and a movable clutch strip 44 having the other clutch tooth 45 that gears with the clutch tooth 42 as necessary is arranged at a position facing the fixed clutch strip 41. The movable clutch strip 44 is freely rotatable with respect to the second output shaft 32, and the gearing thereof is normally released by a spring (not shown). When current flows to the electromagnet 46 in the fixed clutch 41, the movable clutch strip 44 is electromagnetically absorbed to the fixed clutch strip 41 so that the clutch teeth 42, 45 gear with each other, where gearing occurs when a rotation switching signal from the first driving means to the second driving means is input.

Furthermore, an inward facing inner tooth 47 is formed along an entire outer periphery on a side opposite to the movable clutch strip 44, where an outer tooth 49 formed at an outer peripheral edge of an annular transmission member 48 rotatably supported at a periphery on a distal end side of the second output shaft 32 gears with the inner tooth 47 and the inner tooth 47 of the movable clutch strip 44 freely moves along the outer tooth 49. A pulley fixing member 22 having a second pulley 21 fixed at the outer periphery is fixed to the transmission member 48 in an integrally rotatable manner, and the pulley fixing member 22 is gear connected to a transmission shaft 4 arranged on the extension of the same central line as the second output shaft 32 so as to be able to transmit rotation driving force thereto, as shown in FIG. 3.

An endless belt 23 is interposed between the first pulley 20 and the second pulley 21. The endless belt 23 transmits high speed low torque rotation of the first driving means to the transmission shaft 4. Furthermore, the transmission shaft 4 is connected to a drive shaft 5 including a screw fastening member (not shown) such as box bit and cross-bit which distal end passes through the raising/lowering stage 2 and engages the screw component (not shown), as shown in FIG. 2.

In addition, a tubular distortion-causing tube 50 is securely arranged on the housing 3 to cover a periphery of the transmission shaft 4. The distortion-causing tube 50 is adapted such that the transmission shaft 4 receives reactive force that is generated when the screw component is seated on the work (not shown) and fastened at high torque. This produces twist, and a distortion gauge 51 for detecting a distortion corresponding to such twist as electrical signal is attached to the distortion-causing tube 50. The distortion-causing tube 50 and the distortion gauge 51 configure a torque sensor, where the fastening torque is determined in a control unit 6 from the signal of the distortion gauge 51, and a predetermined fastening torque is obtained.

The first and second driving means output signals from the first output shaft 11 and the second output shaft 32. The signals are input to the control unit 6 and processed along with the signal from the sensor. Furthermore, the control unit 6 is adapted to output a signal for flowing and inhibiting current to the clutch member 40, that is, a signal in a stall state (stall refers to a phenomenon in which the first output shaft of the first driving means cannot rotate as rotation is not approved) of the first driving means is output, so that the low speed high torque drive from the second driving means is transmitted. Furthermore, the control unit 6 is configured to determine the maximum number of rotations of the first driving means so that the impact torque, which is generated when the screw component is screwed in at high speed rotation by the first driving means with respect to the final fastening torque set according to the type of screw component and the screw component is seated on the work thereby entering the stall state, does not exceed the final fastening torque.

The operation of the present invention will now be described. In the screw fastening machine having a screw fastening member holding the screw component, the screw component is positioned at the fastening position of the work, and thereafter, the raising/lowering stage 2 is moved forward when the start signal is input. The first motor 10 of the first driving means is then rotated, and the rotation is transmitted from the first output shaft 11 to the first pulley 20. Since the first driving means produces a high speed low torque rotation, the second pulley 21 is rotated by the first pulley 20 via the endless belt 23, and the rotation is transmitted to the transmission shaft 4. In this case, the connection of the second output shaft 32 of the second driving means and the transmission shaft 4 is shielded by the clutch member 40, whereby the drive shaft 5 rotates at high speed without any resistance, and the screw component is screwed into the work.

In this manner, when the screw component is screwed in at high speed rotation and the screw component is seated on the work, the first motor 10 of the first driving means enters the stall state, the start signal in the control unit 6 is input to the second motor 30 of the second driving means and the current flows to the clutch member 40 to have the clutch member 40 in the ON state, the movable clutch strip 44 of the clutch member 40 is electromagnetically absorbed to the fixed clutch strip 41 so that the respective clutch teeth 42, 45 gear with each other, and rotation of low speed high torque from the second driving means is transmitted. The rotation of the clutch member 40 is transmitted to the transmission shaft 4 via the pulley fixing member 22, to which the second pulley 21 is fixed, and the screw component is fastened to the work by the drive shaft 5 including the screw fastening member. During the rotation at low speed high torque, fastening is completed when the fastening torque reaches the final fastening torque, which is set in advance to a predetermined value, by the torque sensor.

In the fastening work of the screw component, the stall state by the first driving means is drive controlled by the control unit 6 so as to occur at the impact torque lower than the final fastening torque, whereby an inertia in the first driving means becomes small and the final fastening torque is accurately obtained by the second driving means. Therefore, the fastening work from the start of screw fastening until the seating on the work by means of the first driving means is performed at high speed rotation.

On the other hand, the control unit 6 performs the control such that the second driving means rotatably drives the transmission shaft 4 until the final fastening torque is reached in place of the rotation drive of the transmission shaft 4 by the first driving means when the screw component is seated on the work by the high speed low torque screwing work of the first driving means and the stall state is achieved, where the control unit 6 detects the stall state and controls the first and second driving means, and also determines whether or not the final fastening torque has been reached when the screw component is seated. Therefore, the fastening work is comprehensively controlled so that fastening of the screw component is efficiently performed by transmitting and receiving signals of the first driving means, the second driving means, the clutch member 40, the torque sensor and the like with the control unit 6.

Subsequently, when the fastening work cycle of the screw component is completed, the raising/lowering stage 2 is moved backward and returned to its original position. In this case, the electromagnetic absorption signal of the clutch member 40 is turned OFF, and the movable clutch strip 44 is released from gearing with the fixed clutch strip 41 so as to return to an original state and be in a waiting state until a next work cycle.

A rotation transmitting path from the first driving means according to the present embodiment is the belt drive, and thus the signal line from the torque sensor can be wired by effectively utilizing such space, whereby the signal lines can be accommodated in the housing 3 and the entire screw fastening machine can be miniaturized. Furthermore, since the high speed rotation is transmitted via the endless belt 23, slight extension thereof can be expected, whereby the impact torque, although little, is alleviated and the noise is reduced.

What is claimed is:

1. A screw fastening machine comprising a drive shaft for engaging a screw component and screwing in the screw component to a work, a first driving means for applying driving force of high speed low torque to the drive shaft, and a second driving means for applying driving force of low speed high torque when the high speed low torque drive is finished; wherein
   a first pulley is fixed to a first output shaft of the first driving means, a second pulley is fixed in an integrally rotatable manner to a transmission shaft for connecting the drive shaft, and an endless belt is interposed between the pulleys to obtain a configuration for high speed low torque drive;
   the second driving means for performing low speed high torque drive is arranged on a back side on an extension of the transmission shaft until a final fastening torque is reached, a clutch member is interposed between a second output shaft of the second driving means and the transmission shaft, and the first and second driving means are electrically connected to a control unit having a configuration of performing a control such that the rotation drive changes from by the first driving means to by the second driving means so that the second driving means rotatably drives the transmission shaft until the final fastening torque is reached when the screw component is seated on the work by the high speed low torque screwing work by the first driving means and a stall state is achieved.

2. The screw fastening machine according to claim 1, wherein gearing of the clutch member is normally released, but gearing occurs when a rotation switching signal from the first driving means to the second driving means is input so that the rotation driving force from the second driving means is transmitted to the drive shaft via the transmission shaft.

3. The screw fastening machine according to claim 1 or 2, wherein the clutch member is a fixed clutch strip fixed to the second output shaft of the second driving means and a movable clutch strip rotatable with respect to the second output shaft, the movable clutch strip being rotatable with the transmission shaft, the movable clutch strip being electromagnetically absorbed to the fixed clutch strip when a stop signal of the first driving means is input so that the driving force from the second driving means is transmitted to the transmission shaft.

4. The screw fastening machine according to claim 1 or 2, wherein the second driving means is adapted to transmit the rotation driving force to the second output shaft via a harmonic drive (registered trademark) reducer for converting the driving force from the second motor to the driving force of low speed high torque.

5. The screw fastening machine according to claim 1 or 2, wherein the control unit is configured to determine the maximum number of rotations of the first driving means so that an impact torque being generated when the screw component is screwed in at high speed rotation by the first driving means with respect to the final fastening torque set according to the type of the screw component and the screw component is seated on the work thereby entering the stall state, does not exceed the final fastening torque.

\* \* \* \* \*